United States Patent
Huang

(10) Patent No.: US 10,890,563 B2
(45) Date of Patent: Jan. 12, 2021

(54) DOWNHOLE TOOL WITH AN ULTRASONIC PROBE FOR MEASURING FLUID FLOW PROPERTIES

(71) Applicant: SCHLUMBERGER TECHNOLOGY CORPORATION, Sugar Land, TX (US)

(72) Inventor: Songming Huang, Cambridge (GB)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 0 days.

(21) Appl. No.: 16/349,579

(22) PCT Filed: Nov. 13, 2017

(86) PCT No.: PCT/US2017/061225
§ 371 (c)(1),
(2) Date: May 13, 2019

(87) PCT Pub. No.: WO2018/089869
PCT Pub. Date: May 17, 2018

(65) Prior Publication Data
US 2019/0277806 A1    Sep. 12, 2019

(30) Foreign Application Priority Data
Nov. 11, 2016    (GB) .................................. 1619066.2

(51) Int. Cl.
*G01N 29/032*    (2006.01)
*G01N 29/22*    (2006.01)
(Continued)

(52) U.S. Cl.
CPC .......... *G01N 29/032* (2013.01); *E21B 47/10* (2013.01); *E21B 47/107* (2020.05); *G01N 29/02* (2013.01);
(Continued)

(58) Field of Classification Search
None
See application file for complete search history.

(56) References Cited

U.S. PATENT DOCUMENTS

| 4,947,683 A | 8/1990 | Minear et al. |
| 5,354,956 A | 10/1994 | Orban et al. |

(Continued)

FOREIGN PATENT DOCUMENTS

| EP | 2610432 A1 | 7/2013 |
| GB | 2280267 A | 1/1995 |

(Continued)

OTHER PUBLICATIONS

Combined Search and Exam Report Under Sections 17 and 18(3) of UK Patent Application No. 1619066.2, dated May 21, 2020, 2 pages.

(Continued)

*Primary Examiner* — Harshad R Patel

(57) ABSTRACT

A downhole tool for measuring flow properties of a multiphase fluid flow at a location within a subterranean borehole includes at least one ultrasonic probe with a transducer unit having an ultrasound transmission/receiving surface which, in use, interfaces with the multiphase fluid flow. At the surface, the transducer unit transmits ultrasonic acoustic waves into the multiphase fluid flow and receives reflections of the acoustic waves from the multiphase fluid flow. At least one piezoelectric element of the transducer unit produces the acoustic waves. The transducer unit focuses the transmitted acoustic waves into a focus volume in the multiphase fluid flow, which focus volume contains a position of maximum intensity of the transmitted acoustic waves that is spaced a distance of 50 mm or less from the surface. An electronic (Continued)

controller operates the transducer unit, and a signal processor measures properties of the fluid flow from the received reflected acoustic waves.

17 Claims, 13 Drawing Sheets

(51) Int. Cl.

| | | |
|---|---|---|
| *G01N 29/26* | (2006.01) | |
| *G01N 29/40* | (2006.01) | |
| *G01N 29/34* | (2006.01) | |
| *G01N 29/02* | (2006.01) | |
| *G01N 29/24* | (2006.01) | |
| *G01N 29/024* | (2006.01) | |
| *E21B 47/10* | (2012.01) | |
| *E21B 47/107* | (2012.01) | |
| *G01F 1/74* | (2006.01) | |
| *G01F 1/66* | (2006.01) | |
| *G01P 5/24* | (2006.01) | |

(52) U.S. Cl.
CPC ......... *G01N 29/024* (2013.01); *G01N 29/221* (2013.01); *G01N 29/24* (2013.01); *G01N 29/262* (2013.01); *G01N 29/34* (2013.01); *G01N 29/40* (2013.01); *G01F 1/663* (2013.01); *G01F 1/74* (2013.01); *G01N 2291/012* (2013.01); *G01N 2291/015* (2013.01); *G01N 2291/02836* (2013.01); *G01P 5/24* (2013.01)

(56) References Cited

U.S. PATENT DOCUMENTS

| | | | | |
|---|---|---|---|---|
| 6,502,465 | B1* | 1/2003 | Vedapuri | G01F 1/66 |
| | | | | 73/861.04 |
| 7,596,987 | B2 | 10/2009 | Gysling et al. | |
| 7,984,642 | B2* | 7/2011 | Africk | G01N 15/02 |
| | | | | 600/440 |
| 9,424,674 | B2 | 8/2016 | Black et al. | |
| 9,429,457 | B2 | 8/2016 | Bousche et al. | |
| 9,448,189 | B2 | 9/2016 | Korkin et al. | |
| 2006/0242853 | A1 | 11/2006 | Wu et al. | |
| 2010/0095757 | A1 | 4/2010 | Hansen | |
| 2012/0179377 | A1* | 7/2012 | Lie | G01V 1/52 |
| | | | | 702/6 |
| 2016/0238422 | A1 | 8/2016 | Wee et al. | |
| 2016/0238423 | A1 | 8/2016 | Steven et al. | |
| 2016/0245073 | A1 | 8/2016 | Hansen et al. | |
| 2016/0245074 | A1 | 8/2016 | Schollenberger et al. | |
| 2016/0245684 | A1 | 8/2016 | Wee et al. | |
| 2016/0245781 | A1 | 8/2016 | Ahmad et al. | |
| 2016/0252380 | A1 | 9/2016 | Henry et al. | |
| 2016/0265345 | A1 | 9/2016 | In 'T Panhuis et al. | |
| 2016/0273950 | A1 | 9/2016 | Henry et al. | |
| 2016/0274204 | A1 | 9/2016 | Song et al. | |
| 2017/0293044 | A1* | 10/2017 | Gilstrap | E21B 47/002 |
| 2018/0011211 | A1* | 1/2018 | Leonard | G01N 29/0645 |

FOREIGN PATENT DOCUMENTS

| | | |
|---|---|---|
| WO | 2015088351 A1 | 6/2015 |
| WO | 2015105977 A1 | 7/2015 |
| WO | 2016135506 A1 | 9/2016 |
| WO | 2016144655 A1 | 9/2016 |
| WO | 2016145524 A1 | 9/2016 |

OTHER PUBLICATIONS

Ravenscroft, F. A. et al., "Ultrasonic Flow Measurement in Horizontal Wells", OTC 8866, Offshore Technology Conference, Houston, Texas, 1998, pp. 649-661.

Morriss, S. L. et al., "Ultrasonic Imaging and Velocimetry in Two-Phase Pipe Flow", Journal of Energy Resources Technology, 1993, 115(2), pp. 108-116.

Nyhavn, F. et al., "Production Logging in Horizontal Wells by Use of Ultrasonics", SPE 57415-PA, SPE Production and Facilities, 1999, 14(3), pp. 161-165.

Zhang, H. et al., "An Ultrasonic Flowmeter in Production Boreholes of Oilfields", Proceedings, 2005 IEEE Ultrasonics Symposium, 2005, pp. 1496-1499.

Combined Search and Exam Report Under Sections 17 and 18(3) of UK Patent Application No. 1619066.2, dated Mar. 30, 2017, 8 pages.

International Search Report and Written Opinion of International Patent Application No. PCT/US2017/061225, dated Feb. 20, 2018, 13 pages.

International Preliminary Report on Patentability of International Patent Application No. PCT/US2017/061225, dated May 23, 2019, 10 pages.

Examination Report Under Section 18(3) of UK Patent Application No. 1619066.2, dated Mar. 6, 2020, 2 pages.

\* cited by examiner

DOWNHOLE TOOL WITH AN ULTRASONIC PROBE FOR MEASURING FLUID FLOW PROPERTIES

CROSS-REFERENCE TO RELATED APPLICATIONS

This application is a National Stage Entry of International Patent Application No. PCT/US2017/061225, filed Nov. 13, 2017, which claims the benefit of, and priority to, United Kingdom Patent Application No. 1619066.2, filed Nov. 11, 2016. Each of the foregoing applications is incorporated herein by this reference in its entirety.

FIELD OF THE INVENTION

The present disclosure relates to a downhole tool for measuring fluid flow.

BACKGROUND

In order to establish a production profile along the depth of an oil well, a production logging tool (PLT) is often sent downhole. The PLT performs flow measurements at different depths. In producing oil wells, the flow is typically a multi-phase mixture containing oil, water, and sometimes gas and/or sand. Therefore a PLT is required to measure the flow rates of all of these individual phases.

Conventionally, the velocity of the continuous phase or that of the flowing mixture is typically measured by various turbine flow-metres (spinners), which include full-bore spinners and miniaturized turbine flow-meters for local velocity measurements. There are various limitations however to turbine based flow-metres: their rotation can be jammed by debris in the flow; they cannot measure flows with very slow velocities (e.g. less than a few $cms^{-1}$) or very high viscosities and non-Newtonian behaviour; and, if present in a very high velocity flow, they are prone to wear and damage.

Phase holdup measurements are also important for production logging. Some conventional PLTs are equipped with local probes which may utilize optical and electrical principles to measure holdups of discrete phases. For instance, an electrical conductivity probe can be used to measure oil/water holdups according to the time period in which the tip of the probe is within oil or water respectively. Similarly, an optical probe can measure the time spent in a gas or liquid phase to determine the gas volume fraction. These local probes, however, are highly susceptible to contamination. For example, a droplet of one phase might stick to the tip of the probe and refuse to be swept away by the flow surrounding it. There is also an issue with detecting small sized droplets/bubbles because they can simply drift around the tip and not interact with it.

Ultrasonic techniques have been attempted in the past to measure flow velocity in production logging applications. The techniques used including particle tracking (Ravenscroft F. A., Gulliver J., Searight T. and Hayes D., "Ultrasonic Flow Measurement in Horizontal Wells", OTC 8866, Offshore Technology Conference, Houston, Tex., 4-7 May 1998, pp 649-661), Doppler imaging (Morriss S. L. and Hill A. D., "Ultrasonic Imaging and Velocimetry in Two-phase Pipe Flow", Journal of energy resources technology [0195-0738], vol: 115 iss: 2, 1993 pp. 108-116; and Nyhavn F., Bang J. and Oyangen T., "Production Logging in Horizontal Wells by Use of Ultrasonics", (SPE 38499), SPE Production and Facilities, Vol. 14 (3), August 1999, pp. 161-165), transit time measurements (Zhang H., Lin W., Zhang C. and Wang D., "An Ultrasonic Flowmeter in Production Boreholes of Oilfields", Proceedings, 2005 IEEE Ultrasonics Symposium, pp. 1496-1499, 2005) and an ultrasonic phased array imaging and Doppler measurement tool described in WO 2016/145524 A1.

In such conventional techniques, the ultrasonic transducers are mounted on a logging tool, forming part of a main tool body, which typically has a diameter of 17 mm-25 mm ($^{11}/_{16}$"-1"). To log a wellbore with a relatively large diameter, e.g. 180 mm (7"), casing ultrasonic waves need to propagate across a large part of borehole in order to measure flow features near the casing wall. In a multi-phase flow containing significant concentration of discrete features such as liquid droplets, gas bubbles and/or solid particles, the ultrasonic waves, as they propagate further away from the tool, become more and more diffused by the refraction and scattering effects of various fluid/fluid and/or fluid/solid interfaces associated with these discrete features. Therefore the measurement accuracy often deteriorates further away from the tool.

SUMMARY

It would be desirable to provide an improved tool for measuring flow properties of multiphase fluid flows downhole.

Accordingly, in a first aspect, the present disclosure provides a downhole tool for measuring flow properties of a multiphase fluid flow at a location within a subterranean borehole, the tool including at least one ultrasonic probe comprising:

at least one transducer unit having an ultrasound transmission/receiving surface which, in use, interfaces with the multiphase fluid flow, the transducer unit being configured to transmit ultrasonic acoustic waves into the multiphase fluid flow at said surface and to receive reflections of the acoustic waves from the multiphase fluid flow at said surface, the transducer unit further having at least one piezoelectric element for producing the acoustic waves, and the transducer unit being further configured to focus the transmitted acoustic waves into a focus volume located in the multiphase fluid flow, wherein the focus volume contains a position of maximum intensity of the transmitted acoustic waves, which position is spaced a distance of 50 mm or less from said surface;

an electronic controller configured to operate the transducer unit; and a signal processor configured to measure properties of the fluid flow from the received reflected acoustic waves;

By focusing the transmitted acoustic waves such that the position of maximum intensity of the transmitted acoustic waves is spaced a distance of 50 mm or less from the transmission/receiving surface of the transducer unit, the probe has local sensitivity which enables fluid flow properties to be more accurately measured. Further, as the ultrasonic probe can avoid having moving measuring parts in the flow, it can have an operational advantage over turbine-based flow-meters.

In a second aspect, the disclosure provides a deployment means, such as a drillstring, a wireline, or coiled tubing including the downhole tool of the first aspect.

In a third aspect, the disclosure provides a method of measuring properties of a multiphase fluid flow at a location within a subterranean borehole, the method including:

providing a downhole tool according to the first aspect within the subterranean borehole; and operating the ultrasonic probe(s) of the tool to measure properties of the fluid flow.

For example, when the tool includes plural probes, the method may further include combining the measured properties from the probes at different positions in the borehole to characterize the overall borehole flow.

Optional features of the present disclosure will now be set out. These are applicable singly or in any combination with any aspect of the disclosure.

The position of maximum intensity may be spaced a distance of 25 mm or less from the transmission/receiving surface.

The position of maximum intensity may be spaced a distance of 1 mm or more from the transmission/receiving surface, and preferably 5 mm or more from the transmission/receiving surface The position of maximum intensity of the transmitted acoustic waves may be in the near field of the transducer unit. By near field, it may be meant that the distance from the transducer unit to its position of maximum intensity (i.e. "focal point") is such that changes to the amplitude of the sound pressure over that distance do not obey the inverse square law (i.e. the amplitude of the sound pressure varies approximately linearly with distance). Preferably, by near field it is meant that the distance, N, from the transducer unit to its focal point is given approximately by the equation:

$$N = \frac{f\, D^2}{4\, c} \qquad \text{Eq. 1}$$

where f is the frequency of the transmitted acoustic waves, D is the diameter of the transducer unit, and c is the speed of sound in the fluid. Generally, the focal length of the transducer unit, F, may be chosen to be a fraction of N, with the normalised focal length $S_F$, ranging between 0.1 and 0.7 as given in the equation:

$$S_F = \frac{F}{N} \qquad \text{Eq.2}$$

However, another option if for the focal point to be in part of the far field of the transducer unit. This can be achieved by using different focusing methods, such as by using a phased array (discussed below), or by using a small sized piezoelectric element, which generates a natural focus volume in its far field, and which, due to the small size of the element, is still physically close to the transducer unit and therefore provides local sensitivity.

The transducer unit may comprise a single piezoelectric element or plural piezoelectric elements.

For example, the transducer unit may comprise a piezoelectric element and an acoustic lens acoustically coupled to the piezoelectric element, wherein the acoustic lens focuses the transmitted acoustic waves into the focus volume.

As another example, the transducer unit may comprise an array of independently drivable piezoelectric elements, and the electronic controller operates to drive the piezoelectric elements as a phased array (e.g. in a beam-forming mode) to focus the transmitted acoustic waves into a focus volume. For example, the phased array may be a concentric phased array of circular ring piezoelectric elements. The focus volume and its position of maximum intensity can then be controlled by the electronic controller to be positioned at different distances from the transmission/receiving surface.

As another example, the phased array may be a linear phased array of piezoelectric elements. The focus volume and its position of maximum intensity can then be controlled by the electronic controller to be positioned at different distances from the transmission/receiving surface and/or at different positions along the length direction of the phased array.

The focus volume may be a substantially cylindrical volume. The cylindrical volume may have a diameter of 0.05 mm or more, and/or of 30 mm or less. It may have a length of 0.5 mm or more, and/or of 40 mm or less.

The probe may further comprise backing material positioned immediately adjacent to the transducer unit, the backing material defining a bandwidth of the transducer unit. The backing material may function as a dampener, and have an impedance similar to that of the transducer unit.

The transducer unit may further comprise a window for forming the transmission/receiving surface. The window may be positioned immediately adjacent to the piezoelectric element(s) of the unit (e.g. on an opposing side of the, or each, piezoelectric element to the backing material). The window may provide an impedance matching layer, so as to reduce transmission loses.

The electronic controller may be configured to operate the transducer unit so as to perform range-gating on the received reflected acoustic waves. Range-gating is a process of selecting signals from within an interrogation range of interest, by which signals received which are received 'too soon', i.e. reflections from material between the transmission/receiving surface and the focus volume, may be ignored. Similarly signals received 'too late', i.e. reflections from material beyond the focus volume, may also be ignored.

The electronic controller may be configured to perform Doppler and/or pulse-echo measurements, and the signal processor may be configured to calculate the flow velocity from the measurements.

The transducer unit may be operable at frequencies of 0.5 MHz or more (preferably 1 MHz or more) and/or 200 MHz or less (preferably 10 MHz or less).

The signal processor may measure the fluid flow velocity, the fluid flow rate, the phase holdup of the fluid flow, the speed of sound in the fluid, and/or positions of phase interfaces within the fluid flow.

The signal processor may be configured to identify discrete phases of the multiphase fluid flow by analysing the amplitude and/or phase angles of the reflections of the acoustic waves.

The transducer unit may be a first transducer unit. The ultrasonic probe may then further comprise one or more additional transducer units transmitting ultrasonic waves in different directions with respect to each other. The units may be operable in sequence by the same electronic controller e.g. via a multiplexer, or may be operable in parallel by dedicated electronic controllers of the respective units. The signal processor can be configured to measure properties of the fluid flow from the received reflected acoustic waves of the plural units.

For example, the ultrasonic probe may comprise a second transducer unit arranged transversely to the first transducer unit, such that the focus volumes of the first and second transducer units can be positioned at the same spatial location. The signal processor may be further configured to combine the received reflected acoustic waves from the first and second transducer units into a 2D image. In particular, if the first and second transducer units comprise respective linear phased arrays of independently drivable piezoelectric elements, the respective focus volume of each phased array may be rastered by the electronic controller over a same image area. Conveniently, the first and second transducer units may be arranged transversely so that the two units are at 90° to each other. The ultrasonic probe may even comprise a third transducer unit arranged transversely to the first and second transducer units, such that the focus volumes of the first to third transducer units can be positioned at the same spatial location. In this case, the signal processor may be further configured to combine the received reflected acoustic waves from the first to third transducer units into a 3D image.

As another example, the probe may comprise two, three, four, five or more transducer units, all operable by the electronic controller, the units transmitting ultrasonic waves at different and predetermined orientation angles into the fluid flow to interrogate different areas of the flow. These angles may be defined with respect to the axial direction of borehole and the angular distance around that direction. One of the units may transmit ultrasonic waves along a direction that is aligned with a radial direction of the borehole, enabling the measurement of radial flow velocity along that direction, The tool may have plural of the ultrasonic probes, and the signal processor may be configured to measure properties of the fluid flow from the received acoustic waves of the probes. By doing so, the tool may be used to determine an average global fluid property.

The tool may further include a mechanical system that deploys the, or each, ultrasonic probe from a retracted position (e.g. for tripping) to a predetermined position and orientation in the borehole. Such a mechanical system can include one or more moveable carrier arms that deploy the probe(s). When the tool includes plural probes, the mechanical system can deploy the probes to different positions in a borehole (e.g. to different positions on a cross section of the borehole) in order to perform localised flow measurements at the different locations. The localised flow measurements can then be combined to characterise the overall flow through the borehole.

In use (i.e. as deployed in the borehole by, for example, a suitable mechanical system) the ultrasonic probe of the tool may have at least one transducer unit which is tilted or angled relative to the vertical direction in order to measure a flow rate of a horizontally stratified layer in a stratified multiphase fluid flow (e.g. a flow rate of a thin oil layer above a water layer in which the probe is deployed). The same or a different transducer unit of the probe may measure the thickness of the stratified layer In use, one or more ultrasonic probes of the tool may have respective transducer units positioned adjacent the side of the borehole to measure radial flow into the borehole (e.g. production flow through borehole casing perforations) and/or radial flow out of the borehole (e.g. fracturing or loss of circulation during production).

BRIEF DESCRIPTION OF THE DRAWINGS

Embodiments of the present disclosure will now be described by way of example with reference to the accompanying drawings in which.

DETAILED DESCRIPTION AND FURTHER OPTIONAL FEATURES

In the following description, numerous details are set forth to provide an understanding of the present disclosure. However, it will be understood by those skilled in the art that the present disclosure may be practiced without these details and that numerous variations or modifications from the described embodiments are possible.

The disclosure relates to a downhole tool, such as a production logging tool, including at least one ultrasonic probe for measuring flow properties of a multiphase fluid flow in a borehole. The ultrasonic probe can be deployed away from the main tool body to measure the flow properties at a predetermined location in the borehole.

Figure 1:
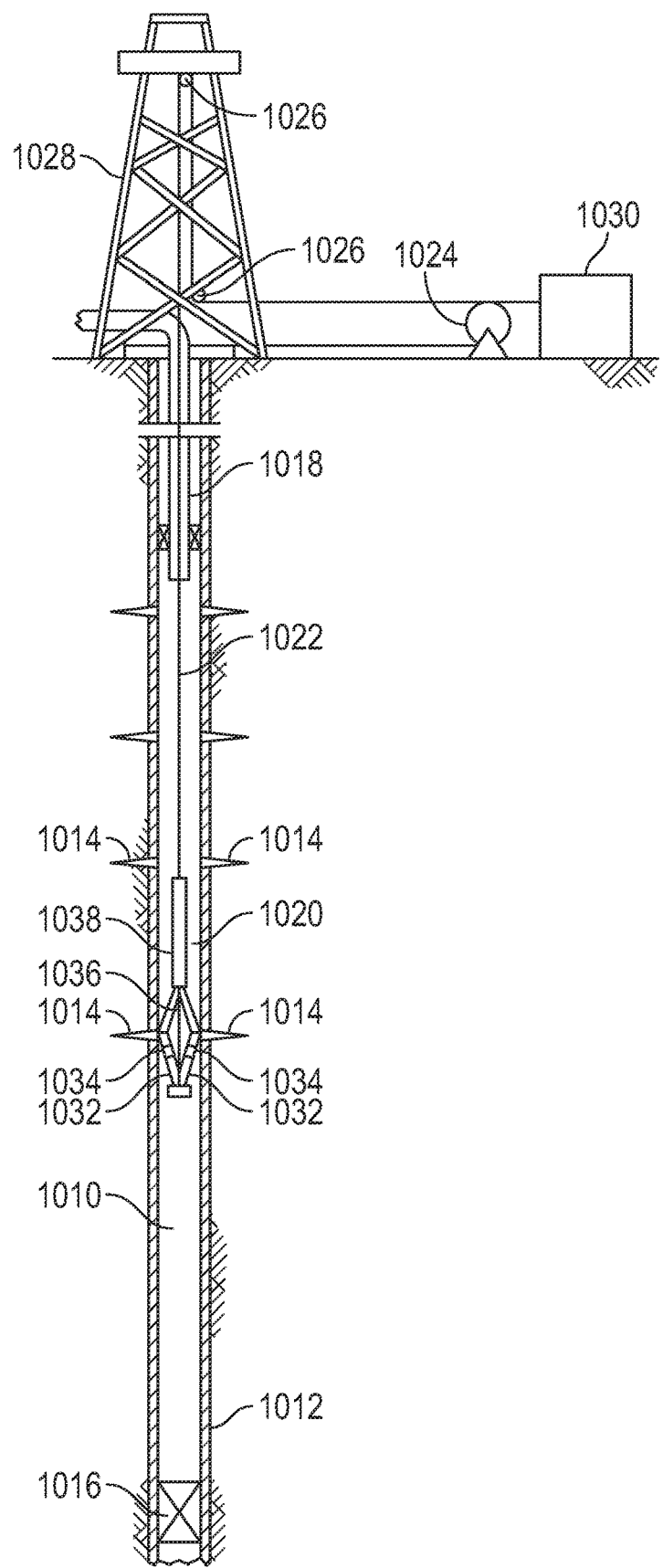
FIG. 1 shows schematically a production wellsite.

In FIG. 1 reference 1010 designates an oilwell in production. The wellbore 1010 is defined by casing 1012 that is provided with perforations 1014 via which the wellbore communicates with at least one underground hydrocarbon reservoir. The perforations 1014 are located between a plug 1016 which closes off the bottom of the wellbore and a bottom end of a production string 1018 via which a multiphase petroleum fluid flows to the surface. The fluid may include, for example, two, three or more phases, e.g., liquid petroleum, gas, water, and solid particles such as sand.

A production logging tool 1020 may be deployed into the wellbore 1010 in a portion situated between the plug 1016 and the bottom end of the production string 1018. The logging tool 1020 may be used to monitor production parameters of the wellbore 1010 as they vary over time. The production logging tool 1020 can be inserted in the wellbore 1010, or in production fluid line conveyed on, for example, a drillstring, wireline, slickline, coiled tubing or towed by a tractor.

The production logging tool 1020 may be centered on an axis of the wellbore 1010 by arms 1032 extendable from a body 1038 of the production logging tool 1020. The arms 1032 may be maintained in abutment against the casing 1012 of the wellbore 1010 when in an extended position. By way of non-limiting illustration, the production logging tool 1020 may, in particular, be implemented as the FLOSCAN IMAGER™ (or FSI™) commercially available from SCHLUMBERGER™ (e.g., for use in horizontal or deviated wells), or as the PS Platform™ commercially available from SCHLUMBERGER™ (e.g., for use in vertical wells).

In the wireline example depicted in FIG. 1, the production logging tool 1020 is suspended at the bottom end of a cable 1022, which passes through the production string 1018 to the surface. The opposite end of the cable 1022 is wound around a winch 1024. Between the winch 1024 and the top end of the production string 1018, the cable 1022 passes over sheaves 1026 mounted on a structure 1028 overlying the wellbore 1010. In a manner well known, means (not shown) may be provided at the surface, in particular for measuring the depth at which the production logging tool 1020 is situated, and the velocity at which the production logging tool 1020 moves in the wellbore 1010 (or alternatively in a production fluid line). The cable 1022 may be operatively connected to a surface installation 1030 establishing a communication link between the production logging tool 1020 and the surface installation 1030 for communication therebetween.

The production logging tool 1020 can be equipped with various sensors for monitoring the wellbore 1010. The arms 1032 may support a certain number of measurement sensors 1034, 1036. In particular, the sensors 1034, 1036 include one or more ultrasonic probes for measuring flow properties of a multiphase fluid flow, as described below.

The production logging tool 1020 may be used to measure fluid in the wellbore, such as production and/or injection fluid flowing into the wellbore from reservoirs in the formation. Information from the production logging tool 1020 (e.g. measurements from the sensors 1034, 1036) may be transmitted to a surface installation 1030 via the cable 1022 in real time. The surface installation 1030 may be provided with equipment enabling the information to be collected, recorded, and processed. Alternatively or additionally, information can be recorded inside the production logging tool 1020, for downloading, use and/or processing. When the measurements are relayed to the surface in real time by telemetry via the cable 1022, means for recording the results of the measurements (i.e. production logs) can also be provided in the surface installation 1030. Recorders may optionally be placed inside the production logging tool 1020.

Figure 2:
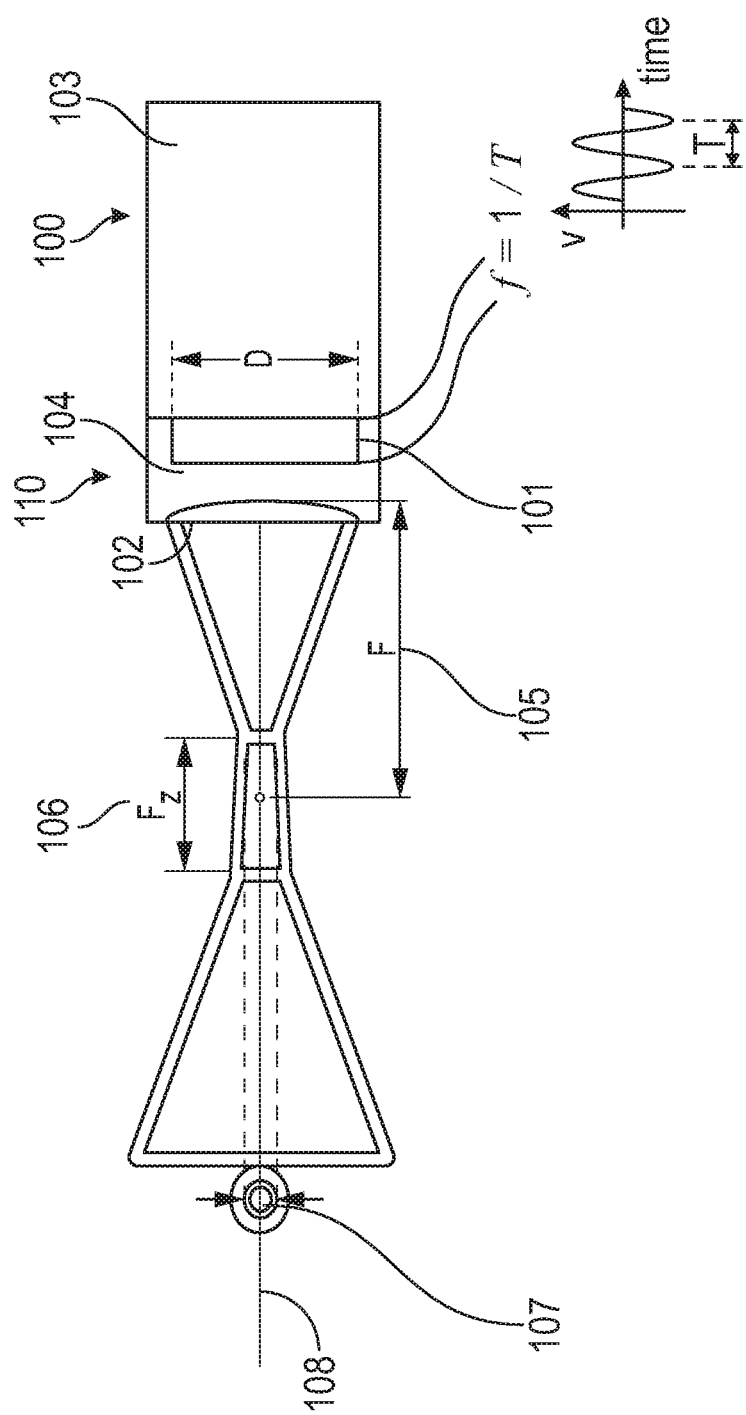
FIG. 2 shows schematically at right in side view an ultrasonic probe utilizing a piezo-electric transducer and an acoustic lens, and at left a front-on view of the focus volume of the probe.

FIG. 2 illustrates an ultrasonic probe 100, which includes a transducer unit 110 comprising a piezo-electric transducer 101 with a diameter D located adjacent to backing or damping material 103. The transducer can be excited by an electrical signal so as to produce ultrasonic acoustic waves. The transducer unit also comprises a window 104 and an acoustic lens 102 formed on the outer face of the window and on an opposite side of the piezo-electric transducer to the backing material. The window is preferably made of a material which matches the impedance of the transducer to that of the lens and/or medium (i.e. a multiphase fluid flow in the wellbore) surrounding the probe so that more of the waves excited by the transducer transmit through into the medium surrounding the probe.

The lens 102 is configured to focus the acoustic waves produced by the transducer 101 over a focal distance 105 into a focus volume 106 having length $F_z$. The waves are transmitted along a beam axis 108 which is generally perpendicular to the face of the lens. The portion of the beam within the focus volume has a beam width 107. This beam width here is between 0.1-10 mm in diameter, and the focus volume is between 1 and 30 mm in length. The beam diameter, BD, of the focus volume, which is defined by −6 dB boundaries, can be given by the equation:

$$BD = 0.2568 DS_F \qquad \text{Eq. 3}$$

The focus volume length $F_z$ can be determined by the equation:

$$F_Z = \frac{2 N S_F^2}{1 + 0.5 S_F} \qquad \text{Eq. 4}$$

For instance, given a 10 MHz transducer of 3 mm diameter, N (the near field distance from the acoustic lens 102 to its focal point) is equal to 15 mm in water. If $S_F=0.4$ is selected, the beam diameter in the focus volume is BD=0.31 mm and the length of the focus volume is $F_Z=4$ mm. In such an example, a 10 to 20 dB signal gain is achievable. When using range-gated Doppler measurement, the relevant range gates can be placed around the middle section of the focus volume, and this increases the tolerance to minor shifts of the focus volume due to the fluid phase change between water and oil in the region between the probe and focus volume. In general, the distance N can be varied by suitable configuration of the transducer unit 110 to be in the range from 1 to 50 mm (and preferably from 5 to 25 mm). Thus the probe 100 has a local sensitivity which enables fluid flow properties adjacent the probe to be accurately measured.

The piezo-electric transducer 101 is excitable by an electrical signal as shown. The signal has an associated frequency defined as f=1/T. The damping material 103 increases the bandwidth of available frequencies by absorbing the acoustic waves which do not travel towards the focus volume. The frequency is in the range of 0.5 MHz to 200 MHz, but preferably from 1 MHz to 10 MHz, which allows increased sensitivity to small scattering features in the multi-phase fluid flow.

The received signals i.e. the echoes from the transmitted signal can used to measure the Doppler frequency shift, Doppler echo amplitude etc. which can be used to determine the fluid flow velocity, fluid flow rate, and phase holdup.

Figure 3:
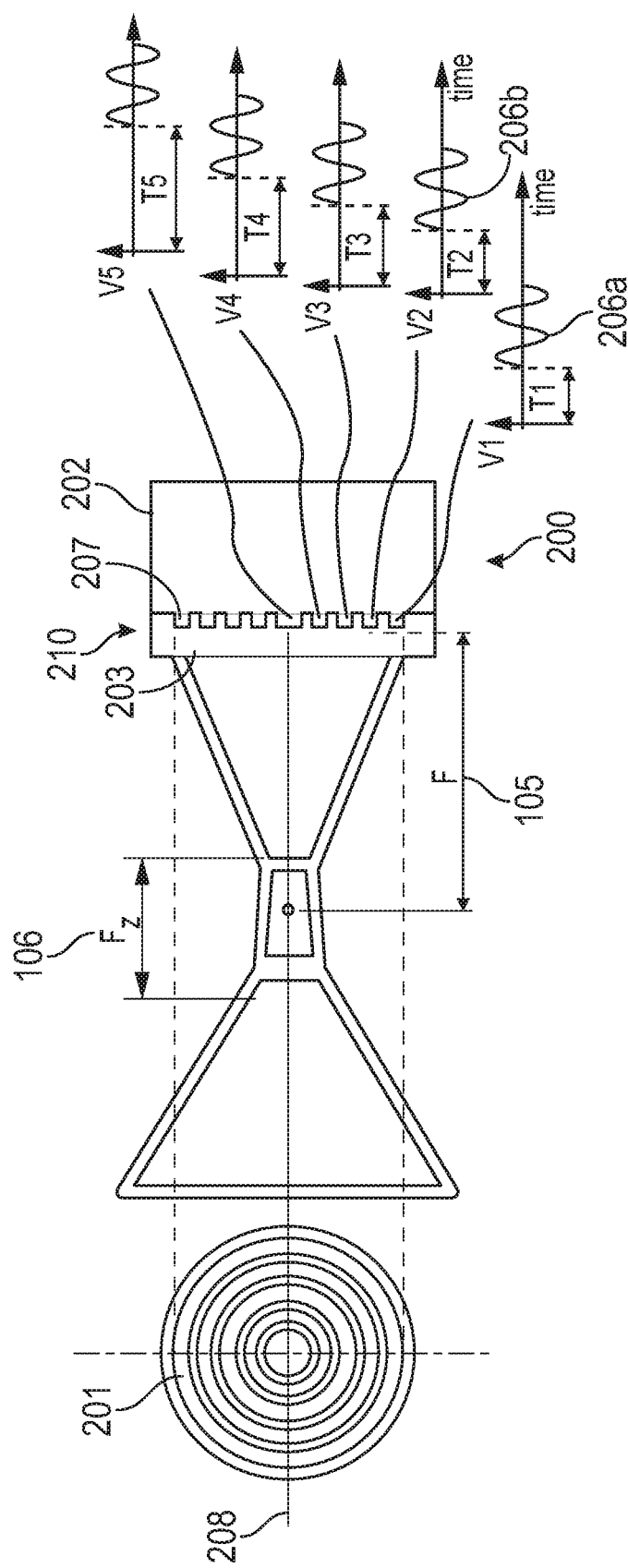
FIG. 3 shows schematically at right in side view an ultrasonic probe utilizing a phased array of ring-shaped piezoelectric elements, and at left a front-on view of the phased array.

FIG. 3 illustrates a different ultrasonic probe 200 including a transducer unit 210. Instead of a single piezo-electric transducer, this transducer unit has a plurality of piezo-electric transducers 207 arranged as a phased array 201. As illustrated, the transducers can be disposed as concentric circular rings around a central circular transducer located on the axis 208 of the transducer unit. The phased array transducer is adjacent to damping material 202 and a window 203. In this example the transducers 207 are driven so as to produce a beam-formed output thereby producing a focus volume 106. The driving signals 206*a*, 206*b*, etc. share an amplitude but have different time delays T1-T5. The time delays are controlled such that the resulting acoustic waves constructively interfere within the focus volume 205.

This is achieved by ensuring that the resulting waves arrive at the focus volume in phase. In some examples there are between 8 and 64 transducers, and each transducer may have a width less than 1 mm. The focus volume can be controlled by the electronic controller, to vary the distance of the focus volume from the phased array. For example, the focus volume can be reduced to effectively a point, which can then be positioned at successive positions along the axis 208, in order to perform a scan within a distance range along the probe axis of from 1 to 50 mm from the outer face of the window 203. However, another option, instead of the concentric ring phased array 201, is to have 1D linear phased array. This allows the focus volume to be rastered over a 2D area, i.e. the lateral position of the focus volume along the length of the phased array, as well as its the distance from the phased array can be varied.

Figure 4:
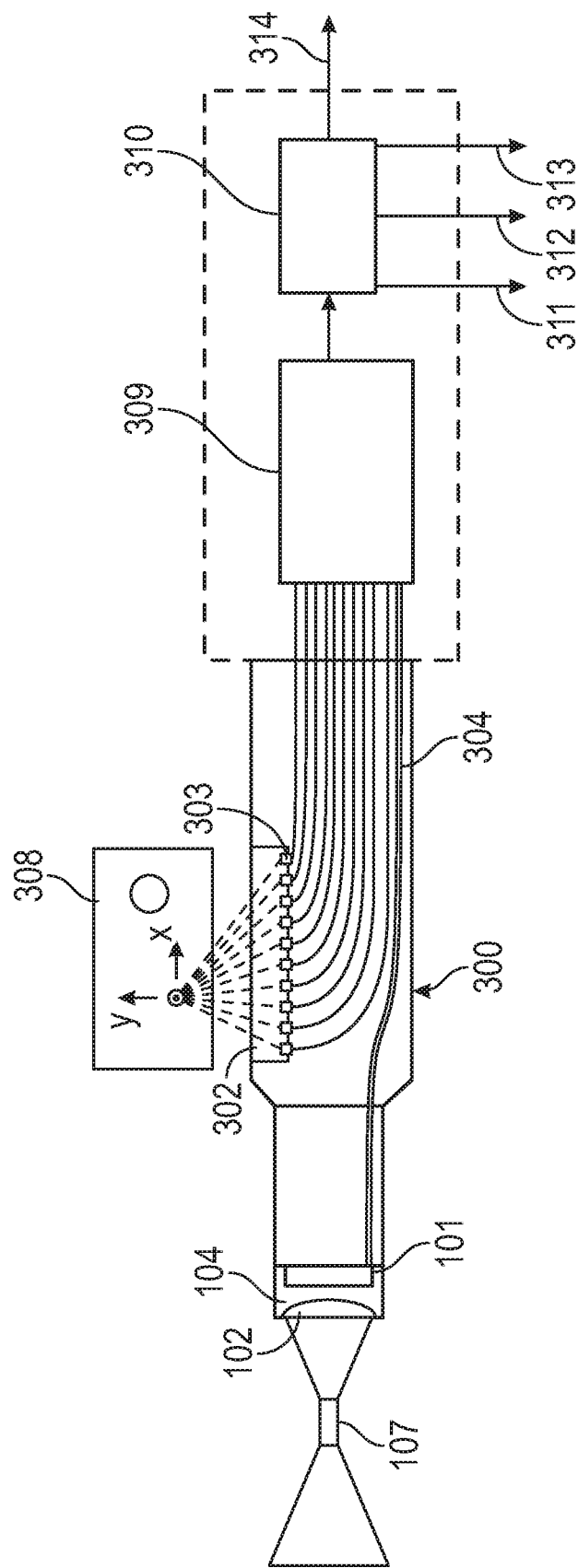
FIG. 4 shows schematically an ultrasonic probe including two ultrasonic transducer units, one having an axially-facing piezoelectric element and the other having a side-facing linear phased array.

An ultrasonic probe 300 is shown in FIG. 4, which combines two ultrasonic transducer units on a single probe, a first one of the units is of the type shown in FIG. 2 and the second is similar to that shown in FIG. 3 except that the unit has a 1D linear phased array 302 of transducers 303.

The first unit having the single transducer 101 operates with a focus volume 107 which is in front of the acoustic lens 102. The second unit having the phased array 302 can operate to raster its focus volume in X and Y directions over an area 308 of the fluid passing the tool to produce a corresponding image of that area.

Both transducers are linked via inter-connects 304 to an electronic controller 309, typically installed inside a downhole tool body from which the probe 300 is deployed, although it may also be possible to fit it into the probe 300 itself. The controller is used to provide electrical pulses to the transducers so as to produce the acoustic waves, as well as to receive the reflected acoustic waves as corresponding electrical pulses. The received signals are then passed to a signal processor 310 which measures the fluid properties and provides them as outputs 311, 312, 313, 314. The fluid properties can be: fluid flow rate, fluid flow velocity, phase holdup, and the position of phase interfaces.

More generally, it is possible that the electronic controller 309 and the signal processor 310 may be located more distal from the probe 300. For example, the controller and processor may be located at the surface and not within the borehole. In such examples, the connection from the surface to the tool can include electrical or optical connections such that the controller is communicably coupled with the transducers.

Figure 5:
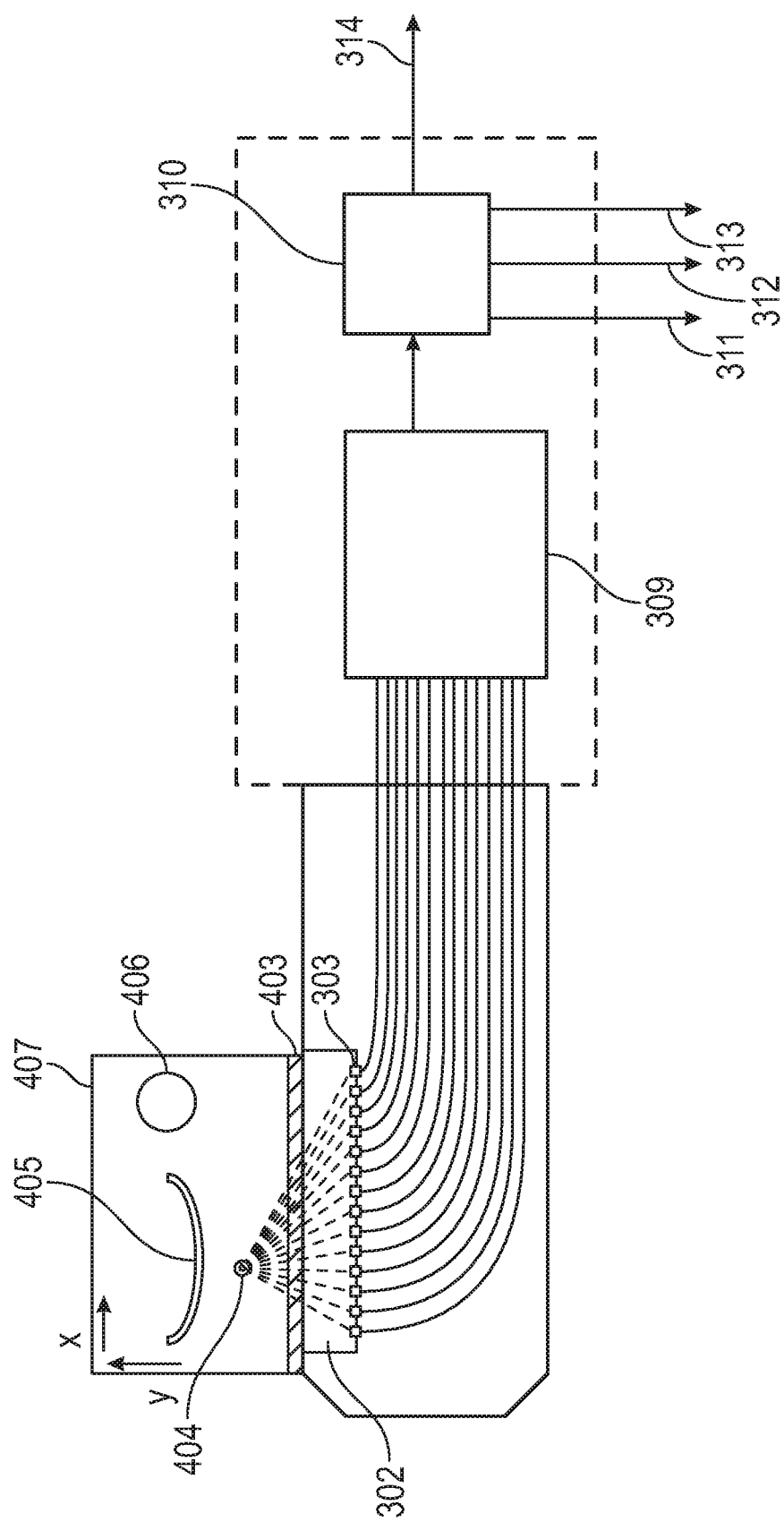
FIG. 5 shows schematically a variant of the ultrasonic probe.

FIG. 5 shows another ultrasonic probe containing only the phased array transducer unit of FIG. 4. The phased array 302 is disposed along one side of the tool and the controller 309 is operated to raster the focus volume 404 of the probe within an area 407 nearby. The result can be processed by the signal processor 310 to form an image with identifiable elements. In particular, the image produced may be a B-Mode scan image i.e. showing the distribution of acoustic impedance within the larger area. This 2D B-scan allows liquid droplets 406 and wetting films 403 to be readily identified, such that the concentration/holdup of droplets within the flow can be calculated.

In the example shown, a hard boundary 405 is detected due to the presence of a gas bubble. Acoustic waves cannot transmit from a liquid medium into a gas medium and so no reflected waves are detected from beyond this hard boundary. Therefore the size of the gas bubble cannot easily be determined. However suspended liquid droplets 406 can be resolved, and their size determined.

Consecutive frames of the images can be combined, for instance by a cross-correlation method, to find velocities of the discrete phases. The velocity of the continuous phase can be obtained from the velocities of very small reflectors (e.g. droplets or bubbles) within the image. A Doppler-mode measurement can also be used to determine velocities, either through continuous wave or pulsed wave ultrasound.

Figure 6:
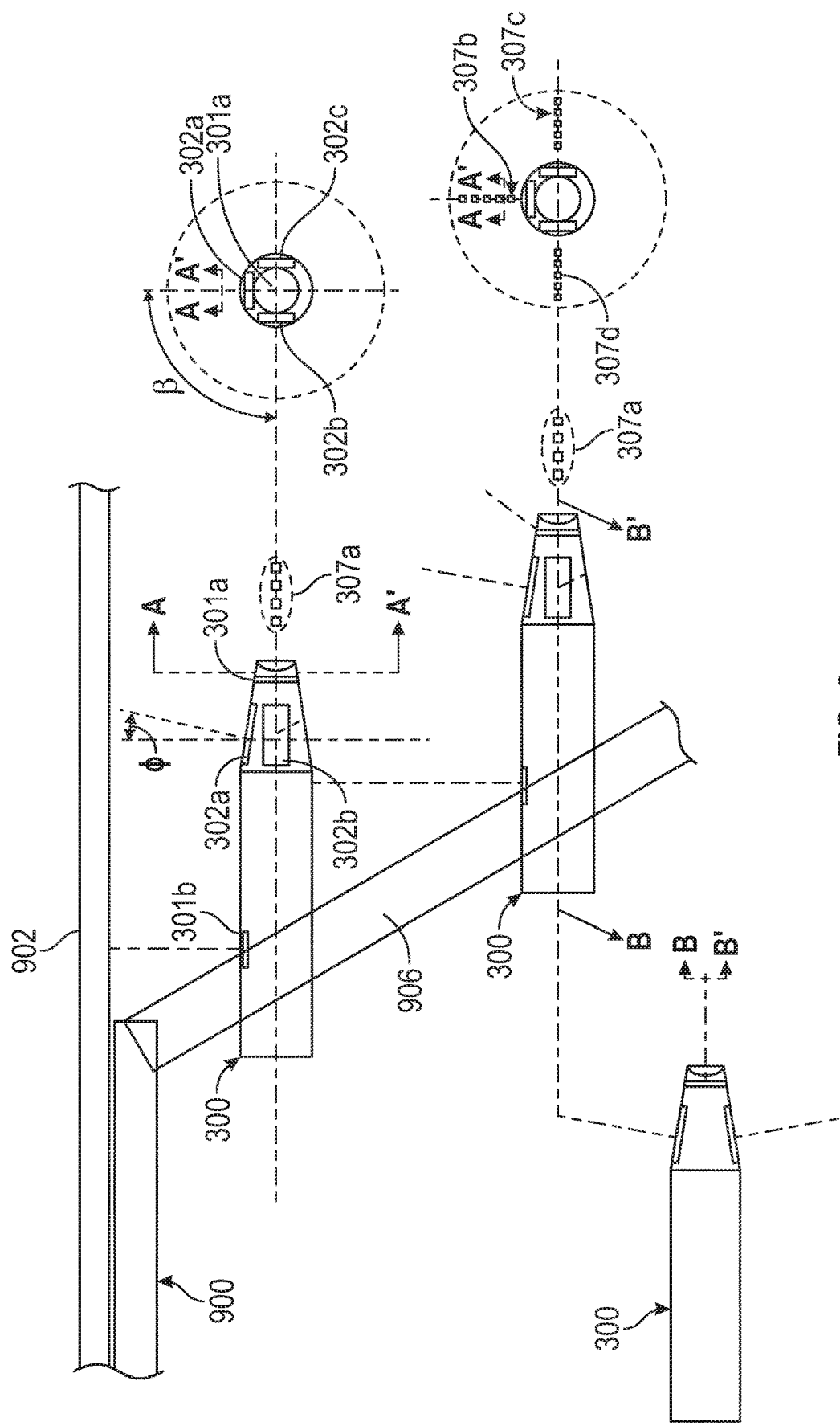
FIG. 6 shows schematically plural ultrasonic probes of another variant attached to a downhole tool.

FIG. 6 shows plural ultrasonic probes 300 attached to a deployable carrier arm 906 of a tool 900 which has been sent downhole and is within a casing 902. During tripping the arm is retracted into the tool. The arm is deployed and the probes moved into position in the borehole when the tool has reached a desired position along therealong. The bottom left schematic of FIG. 6 shows one of the probes 300 as viewed from below along the line B-B'. Each probe comprises five transducer units. A front transducer unit 301a is axially aligned with a length direction of the probe (which also generally corresponds with the fluid flow direction), and a rear transducer unit 301b is axially aligned orthogonally to the length direction of the probe. Three transducer units 302a, 302b, and 302c are then disposed circumferentially around the probe tip. For example, transducer unit 302b is disposed at a circumferential angle $\beta$ (in this case $\beta$ is 90°, as indicated in the top right cross-section A-A' of FIG. 6) to one side of centre transducer unit 302a, while transducer unit 302c is disposed at a circumferential angle of 90° to the other side of centre transducer unit 302a. The axes of the transducer units 302a, 302b, and 302c are also set at an angle $\phi$ from the orthogonal to the length direction of the probe. $\phi$ preferably has a value of between 5° and 30°. The transducer units provide each probe with multiple beam angles to measure fluid flow properties in different regions around the probe, as indicated by the schematic focus volumes 307a, 307b, 307c, 307d of respectively transducer units 301a, 302a, 302b, 302c (the focus volumes 307b, 307c, 307d being shown in the bottom right cross-section A-A' of FIG. 6 as projected into that cross-section).

Figure 7:
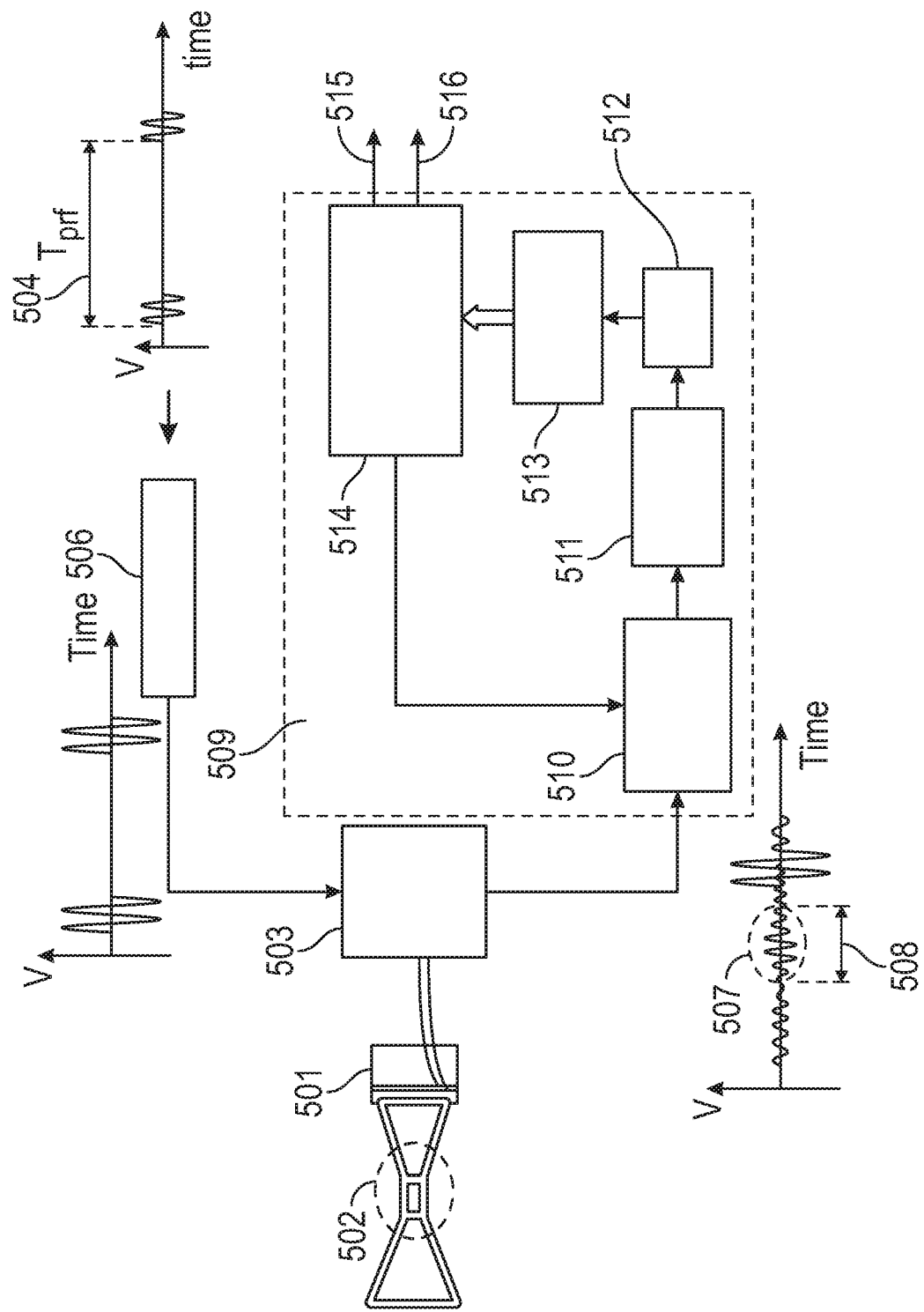
FIG. 7 is a schematic of signal processing performed by an ultrasonic probe.

By including a number of transducer units with different orientations ($\phi$ and $\beta$ values) the probes are able to determine the fluid properties in both axial and radial directions relative to the bore. FIG. 7 shows a signal processing system which can be used in conjunction with an ultrasonic probe 501, e.g. of a type discussed above, configured to focus acoustic waves into a focus volume 502. It is preferred to use pulsed Doppler rather than continuous wave Doppler in order facilitate the selection of the signal from the focus volume, although as discussed below continuous wave Doppler can also be suitable.

The probe is connected to a transmit/receive switch 503 which can be operated to either transmit electrical pulses to the transducer unit of the probe or receive electrical pulses from it. Excitation signal 504 is provided from a signal generator, having a frequency $f_e$ and the signal is repeated at a frequency of $f_{prf}=1/T_{prf}$ where $T_{prf}$ is the time between pulses. In some examples $f_{prf}$ ranges from 1 kHz to 500 kHz. The pulse is transmitted into an amplifier 506 which amplifies the pulse before it is send to the transducer.

Reflected pulses 507 are received by a receiving unit 509 which includes a time delay or range-gate selector component 510. This selects a time-based window 508 of the received pulse which corresponds with signals received from the focus volume 502. The selector component discards any signals received too soon e.g. from reflection off of features closer to the probe than the focus volume, as well as discarding any signals received too late e.g. from reflection off features further from the probe than the focus volume.

The remaining signal 507 is transferred to an amplifier 511 and then a filter 512 (for example an anti-aliasing filter) for amplifying and filtering. The filtered and amplified signal (which is an analogue signal) is then converted to a digital signal by an analogue/digital converter 513. The digital signal is processed by the signal processor 514 so that the measured properties 515, 516 can be outputted.

The signal processor may calculate an average of the measured properties from consecutive received reflected acoustic waves. For examples, 16 consecutive reflections may be used.

The flow velocity can be determined by measuring the Doppler frequency shift Δf of the received reflected acoustic wave(s) relative to the transmitted waves. The flow velocity is defined as:

$$V_{flow} = \frac{\Delta f}{2} \frac{c}{f_e \cos\theta} \qquad \text{Eq. 5}$$

where c is the speed of sound in the fluid, and θ is the angle from the ultrasound beam axis 108 and the fluid flow axis. In some arrangements, $\theta=\pi/2-\phi$, where φ is the angle of a given transducer unit discussed above in relation to FIG. 6. The fluid flow axis is generally considered to be parallel to the borehole length.

Figure 8:
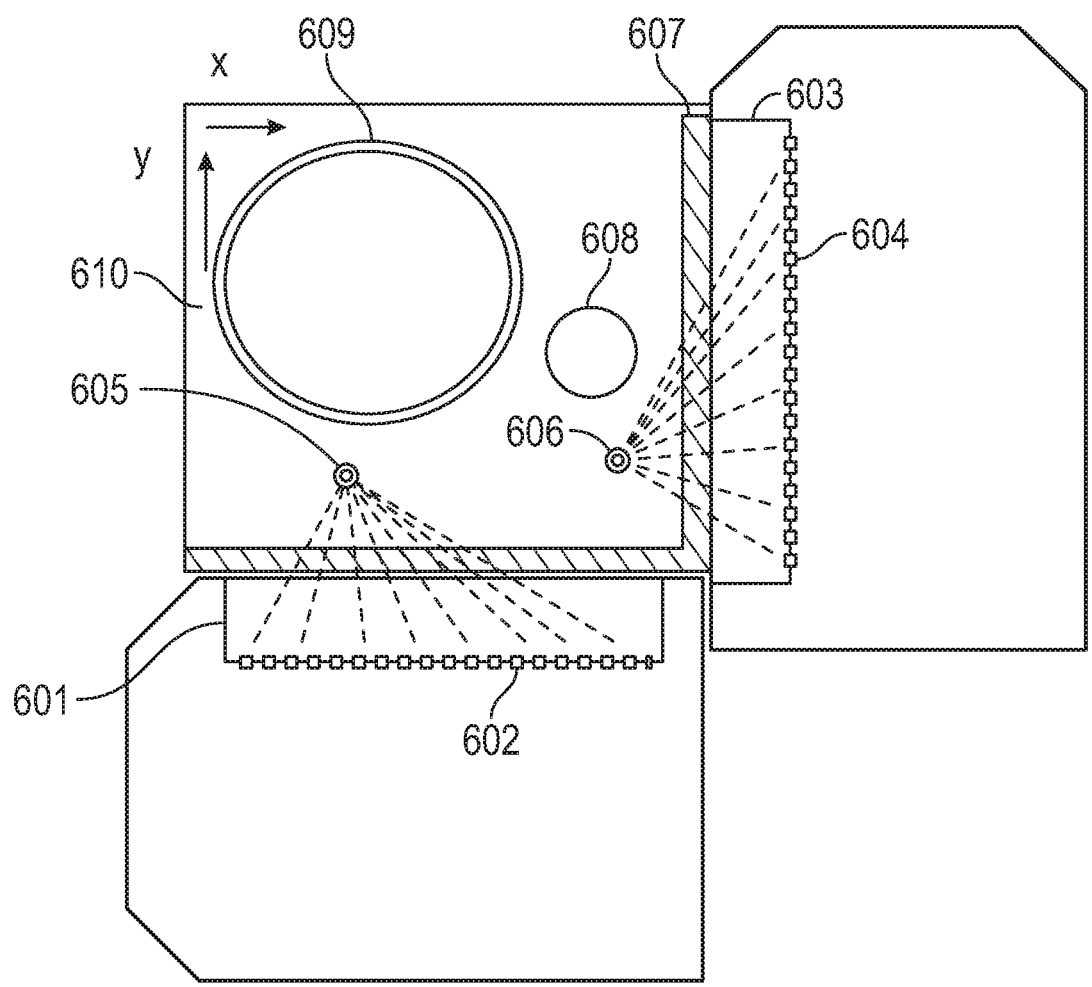
FIG. 8 shows schematically an ultrasonic probe having two phased arrays of piezoelectric elements.

FIG. 8 shows a development of the probe shown in FIG. 5. Here, instead of a single transducer unit there is a pair of units 601 and 603 having respective focus volumes 605 and 606. Each transducer unit of the pair comprises a linear phased array of piezoelectric transducers 602, 604. The transducer units are transversely disposed relative to each other so that the directions of acoustic wave propagation from the two units are at an angle to each other. Conveniently, the transducer units may be at 90° to each other, as illustrated. Therefore the acoustic waves produced by the transducer units intersect and the focus volumes 605, 606 can located at the same spatial locations. The focus volumes of the transducer units can thus be rastered within the same larger area 610 to identify components of the multi-phase fluid flow. However, in contrast to FIG. 5, the entirety of the gas bubble 609 can now be imaged (e.g. as a B-scan image) due to the transverse disposition of the two transducer units which can together can provide boundary information that was inaccessible to the single phased array transducer unit of FIG. 5.

Figure 9:
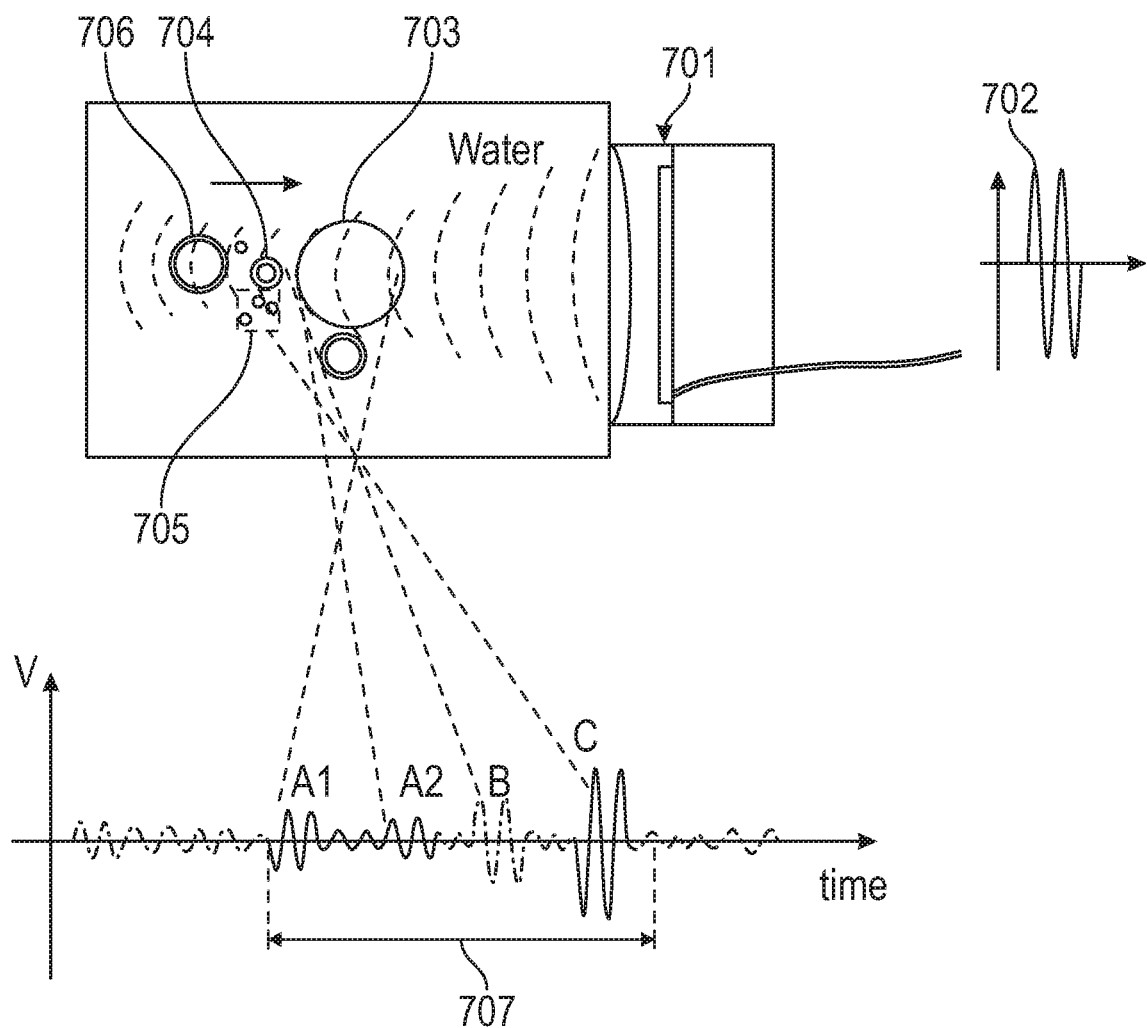
FIG. 9 is a schematic showing transmitted and received acoustic waves.

FIG. 9 shows schematically how discrete phases of the multi-phase fluid can be detected. It is known that acoustic wave echoes from a liquid-to-solid interface generally have no phase changes, whereas those from a liquid-to-gas interface generally have a 180° phase inversion. Also, and more specifically, acoustic wave echoes from a water-to-oil interface generally have a 180° phase inversion, while acoustic wave echoes from an oil-to-water interface generally have no phase changes. This phase change information can be incorporated in the image discussed above, e.g. with one colour representing echoes of 0° phase change and another representing those with 180° phase change. Therefore gas, liquids and solids can be distinguished.

The transducer unit 701 emits an acoustic wave in response to an excitation signal 702 of known amplitude and phase into a water containing oil droplets 703, sand particles 704, and gas bubbles 706. The received reflected acoustic waves from the focus zone are shown in the graph. Regions A1 and A2 of the received reflected acoustic wave correspond to the water-to-oil and oil-to-water interfaces respectively. These are identifiable from the received signal due to (i) their increased amplitude over background noise, (ii) the 180° phase relative to the transmitted signal change shown at A1 which corresponds to an acoustic wave encountering the water-to-oil interface, and (iii) the 0° phase change relative to the transmitted signal shown at A2 which corresponds to the acoustic wave encountering the oil-to-water interface. In contrast, region B of the received reflected acoustic wave corresponds to a water-to-solid interface. This can be identified as such because (i) the amplitude of the returned wave is more greatly increased over the background noise than regions A1 and A2, and (ii) no phase change has taken place. Finally, region C of the received reflected acoustic wave corresponds to a water-to-gas interface and can be identified as such by (i) a very high amplitude (greater than regions A1, A2 and B) due to almost all of the incident acoustic wave being reflected, and (ii) a 180° phase change relative to the transmitted signal.

By identifying the location of the phases in time relative to the transmitted signal, and by assuming or measuring a speed of sound in the fluid, the physical locations of the phases relative to the transducer can be ascertained.

It is also possible to identify gas bubble-free zones 705 in the fluid flow. The Doppler echo energy intensity from such a zone may indicate a concentration of fine sand particles whose individual grain size is below the probe's resolution.

Figure 10:
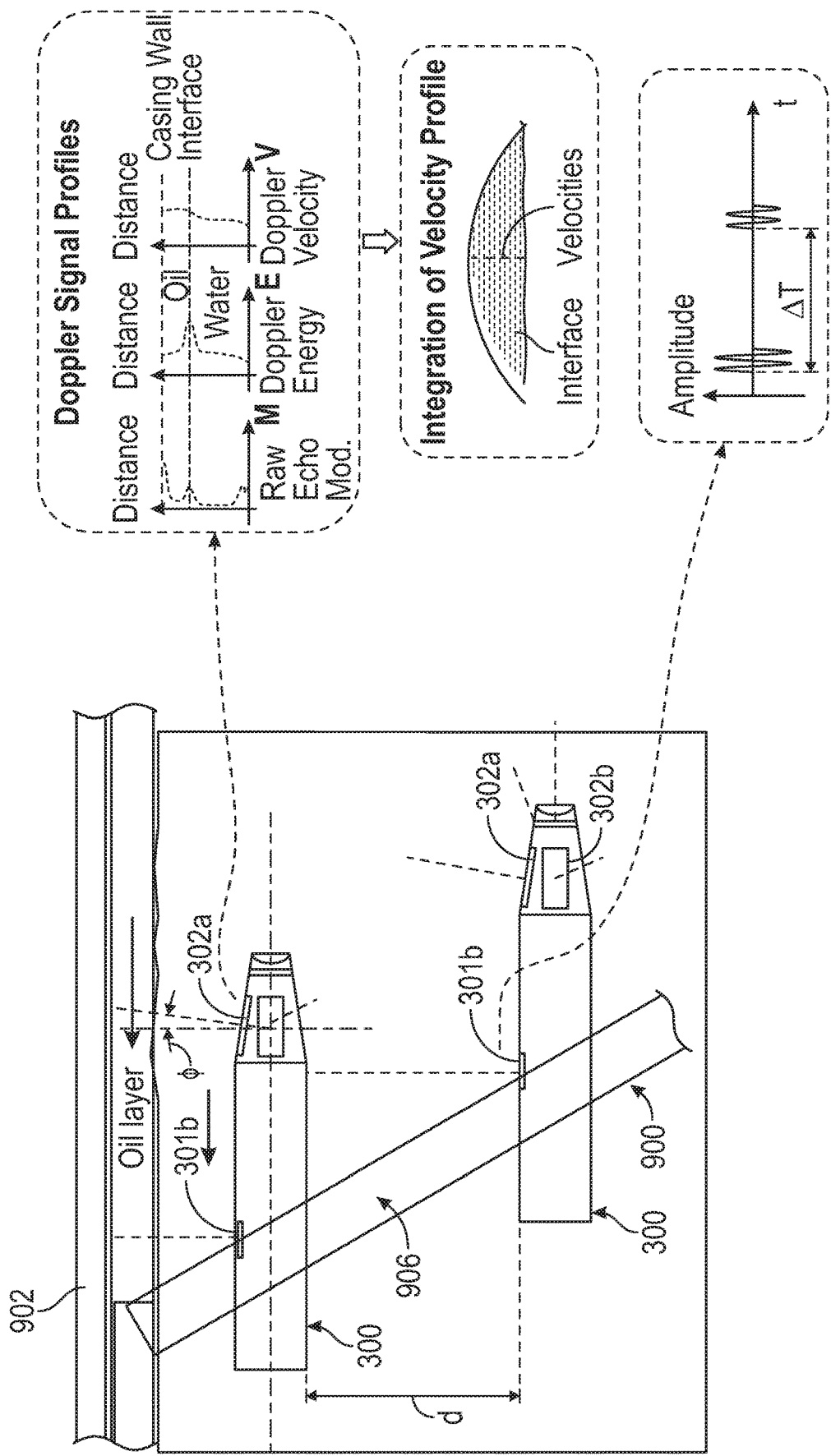
FIG. 10 is a schematic showing the tool of FIG. 6 being used to measure a thin layer of oil in a horizontal oil/water flow, as well as to measure the speed of sound in a fluid.

FIG. 10 shows the tool 900 of FIG. 6 being used to measure the speed of sound within a fluid. The two probes 300 are separated by a known distance d. The lower probe 300 has a transducer unit 301b which is orthogonal to the probe axis, and is aligned with a portion of the upper probe 300. Therefore when this transducer unit 301b emits ultrasonic waves, there is a strong reflection from the upper probe 300. As the distance between the probes is known, the speed of sound c in the intervening fluid can be determined by analysing the round-trip time ΔT of the emitted pulse by use of the equation:

$$d = \frac{\Delta T \ c}{2} \qquad \text{Eq. 6}$$

It is also possible to use a similar transducer unit 301b on the upper probe 300 to measure the speed of sound, c, of the fluid between the probe 300a and a solid target (in this case the casing 902 of the bore). The speed of sound is an indicator of liquid properties. For example, if the liquid is a single-phase liquid, e.g. oil, then the speed of sound in the oil can be used to determine the heaviness of the oil. In another example, if the fluid were a homogeneous oil/water mixture, then the speed of sound in the mixture can be used to determine the water hold up through use of an appropriate mixing law, such as the Wood equation from Wood, A. B., "A Textbook of Sound", G. Bell and Sons, 1941.

As shown in FIG. 10, there can be a stratified thin oil layer adjacent to the topside of a near horizontal casing 902. The transducer unit 302a of the upper probe 300 can be used to measure the flow rate of this thin oil layer. A range-gated Doppler measurement can be performed as shown in the right hand part of FIG. 10. The transducer unit produces a number of signal profiles along a path that extends from the probe surface to the casing. Among the signal profiles, a raw echo modulus can be used to identify the location of the oil/water interface and also the location of the casing. The Doppler energy profile can be used to determine the location of the oil/water interface (because it is dynamic) but not the location of the casing (because it is static). The Doppler velocity profile gives a velocity profile across the oil layer.

The interface position allows the cross-section and hold-up of the oil to be determined. This measurement can then be combined with the velocity profile to calculate the oil layer flow rate. There are other possible modes of operation to improve the measurement accuracy. For example, the focus volumes of the transducer units can be rotated around the angle β such that the emitted ultrasonic waves follow paths which deviate away from the central vertical path across the oil layer. Measurements from several rotational angles provide improved profiling of the velocity across the oil cross-section.

The tool 900 also provides information about non-axially directed flows. As the upwardly pointing transducer units 301b of the two probes 300a, 300b are orthogonal to the axial flow direction (i.e. φ=0°) the Doppler measurement obtained from them is not sensitive to axial flow and has maximum sensitivity to the radially directed flow. However, each probe also has transducer units 302a-302c circumferentially disposed around its tip. If the angle φ of the units 302a-302c is less than 45°, then these will also be more sensitive to non-axially directed fluid flow (i.e. flow which can be radially directed, circumferentially directed or mixed radially-circumferentially directed depending on the location and orientation of the given unit) than axially directed fluid flow.

Figure 11:
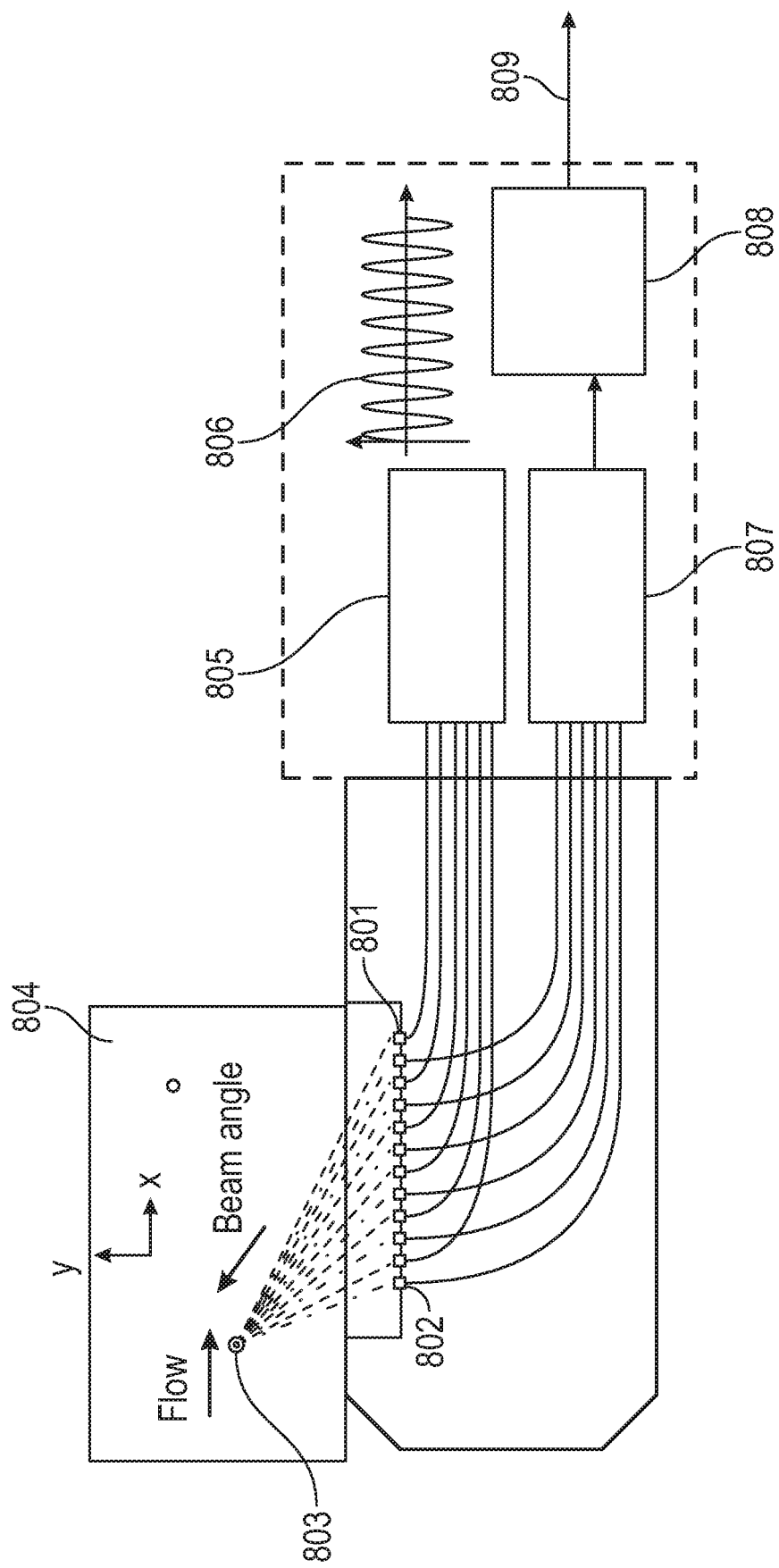
FIG. 11 shows schematically an ultrasonic probe having a phased array transducer unit utilizing a continuous wave excitation signal.

FIG. 11 shows another ultrasonic probe similar to the one shown in FIG. 5. In this example the transducer unit is drive by a continuous wave 806 provided by excitation electronics 805. This continuous wave is provided to piezoelectric excitation transducers 801 of the phased array transducer. Piezoelectric receiver transducers 802 of the phased array receive the reflected acoustic waves, and their signals are received by receiver electronics 807 before being passed to signal processor 808. The signal processor measures the fluid properties 809. In preferred examples half of the transducers in the phased array are excitation transducers and half are receiver transducers.

Figure 12A:
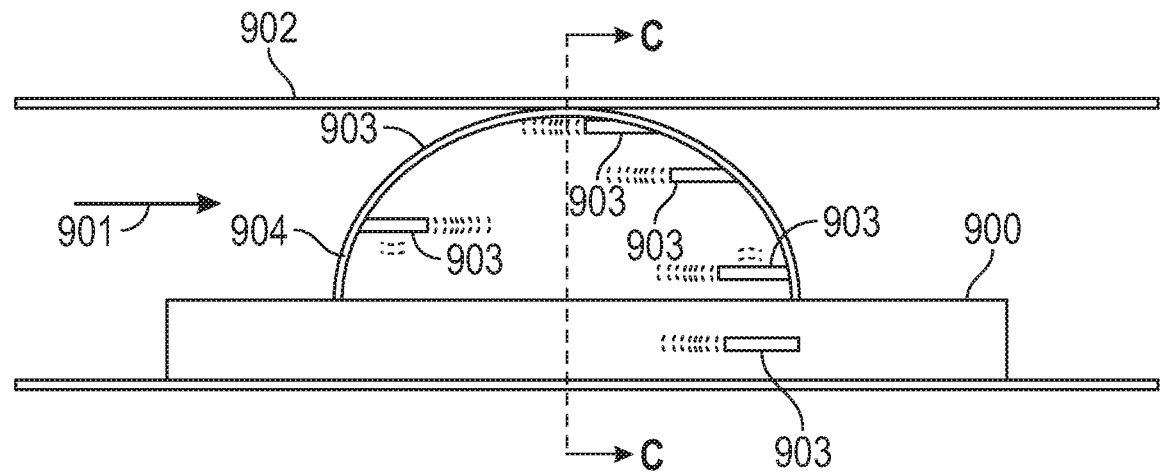
FIG. 12 shows schematically (a) a longitudinal sectional view of a downhole tool including a plurality of ultrasonic probes, and (b) a cross-sectional view along the line C-C.
Figure 12B:
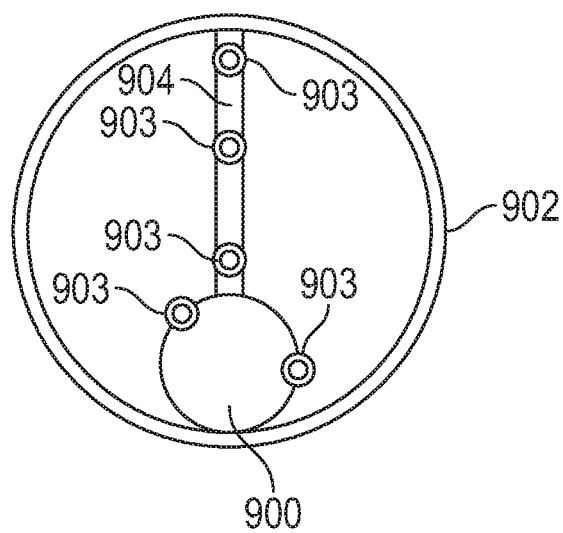

FIG. 12 illustrates a downhole tool 900 within a hole casing 902. Multiphase fluid 901 passes over the tool within the casing. The tool includes a plurality of probes 903 disposed at various points around itself. An arcuate portion 904 of the tool extends from the main tool body and has a number of probes disposed thereon. This allows the tool to measure the global fluid properties across the borehole diameter by averaging the fluid properties measured by the probes.

Figure 13A:
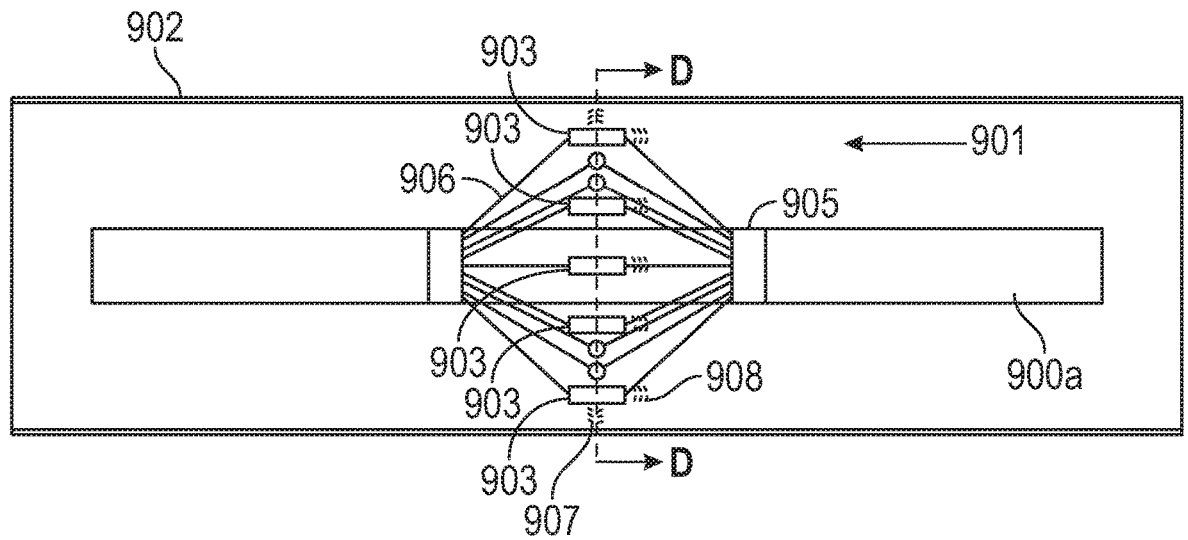
FIG. 13 shows schematically (a) a longitudinal sectional view of another downhole tool including a plurality of ultrasonic probes, and (b) a cross-sectional view along the line D-D.
Figure 13B:
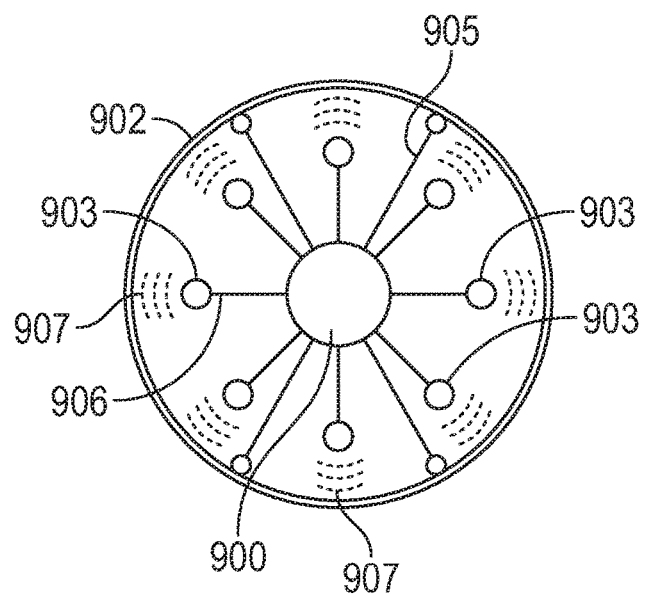

FIG. 13 illustrates another downhole tool 900a within a hole casing 902. Again multiphase fluid 901 passes over the tool within the casing, and the tool includes a plurality of probes 903 disposed at various points around itself. When the tool is in the well bore, a spring loaded open-out and centralising mechanism 905 is activated to deploy radially-extending probe-carrying arms 906 which move the probes from their initially collapsed positions on the tool body towards areas close to the casing, as shown by the D-D cross-sectional view in FIG. 13(b). Each probe has a piezoelectric transducer unit (e.g. similar to unit 301b in FIG. 10) that transmits a beam 907 in the normal to the axial direction of the casing 902 and is used to measure radial direction flows, and another transducer unit (e.g. similar to unit 301a in FIG. 6) which transmits a beam 908 along the axial direction of the borehole to measure axial flow. This allows the tool to measure the distribution of radial flow around the borehole circumference, including flow rates from different perforations. The measurement of radial flow can also help in the detection fracturing or loss of circulation during production. The data from multiple axial velocity transducer units can be integrated across the borehole to derive axial flow rates. Plural tools 900, 900a of the type discussed above can be combined in a single logging tool string in order to improve the spatial resolution of their measurements.

The tool(s) 900, 900a can either be installed permanently within the borehole or instead can be sent downhole by attaching it to, for example, a wireline, drillstring, or coiled tubing.

While the present disclosure has been described in conjunction with the exemplary embodiments described above, many equivalent modifications and variations will be apparent to those skilled in the art when given this disclosure. Accordingly, the exemplary embodiments of the disclosure set forth above are considered to be illustrative and not limiting. Various changes to the described embodiments may be made without departing from the spirit and scope of the disclosure.

All references referred to above are hereby incorporated by reference.

The invention claimed is:

1. A downhole tool for measuring flow properties of a multiphase fluid flowing axially along a subterranean borehole at a location within the subterranean borehole, the downhole tool comprising:
   at least one ultrasonic probe comprising:
      at least one transducer unit having an ultrasound transmission/receiving surface which, in use, interfaces with the multiphase fluid, the transducer unit being configured to transmit ultrasonic acoustic waves into the multiphase fluid at the surface and to receive reflections of the acoustic waves from a liquid-to-liquid interface or liquid-to-gas interface of the multiphase fluid at the surface, the transducer unit further having at least one piezoelectric element for producing the acoustic waves, and the transducer unit being further configured to focus the transmitted acoustic waves into a focus volume located in the multiphase fluid, wherein the focus volume contains a position of maximum intensity of the transmitted acoustic waves, which position is spaced a distance of 50 mm or less from the surface;
   an electronic controller configured to operate the transducer unit; and
   a signal processor configured to measure properties of the multiphase fluid from the received reflected acoustic waves, the measured properties measured from the reflected liquid-to-liquid or liquid-to-gas interface acoustic waves including axial flow properties of the multiphase fluid at a location in the borehole and radially between the downhole tool and a solid surface.

2. The downhole tool of claim 1, wherein the transducer unit comprises an acoustic lens acoustically coupled to the at least one piezoelectric element, wherein the acoustic lens focuses the transmitted acoustic waves into the focus volume.

3. The downhole tool of claim 1, wherein the transducer unit comprises an array of independently drivable piezoelectric elements, and the electronic controller operates to drive the piezoelectric elements as a phased array to focus the transmitted acoustic waves into the focus volume.

4. The downhole tool of claim 1, wherein the focus volume is a substantially cylindrical volume.

5. The downhole tool of claim 1, wherein the at least one ultrasonic probe further comprises backing material, positioned immediately adjacent to the transducer unit, the backing material defining a bandwidth of the transducer unit.

6. The downhole tool of claim 1, wherein the electronic controller is configured to operate the transducer unit so as to perform range-gating on the received reflected acoustic waves.

7. The downhole tool of claim 1, wherein the electronic controller is configured to perform Doppler and/or pulse-echo measurements, and the axial flow properties include flow velocity of the multiphase fluid.

8. The downhole tool of claim 1, wherein the transducer unit is operable at frequencies of from 0.5 MHz to 200 MHz.

9. The downhole tool of claim 1, wherein the signal processor measures fluid flow velocity, fluid flow rate, phase holdup of the multiphase fluid speed of sound in the multiphase fluid, and/or positions of phase interfaces within the multiphase fluid.

10. The downhole tool of claim 1, wherein the signal processor is configured to identify discrete phases of the multiphase fluid flow by analysing the amplitude and/or phase angles of the reflections of the acoustic waves.

11. The downhole tool of claim 1, wherein:
the transducer unit is a first transducer unit;
the at least one ultrasonic probe further comprises:
a second transducer unit, also operable by the electronic controller; and
the second transducer unit is arranged transversely to the first transducer unit, such that the focus volumes of the first and second transducer units can be positioned at a same spatial location.

12. The downhole tool of claim 11, the axial flow properties including at least a velocity profile across a stratified layer of a liquid or gas in the multiphase fluid.

13. The downhole tool of claim 1, wherein the downhole tool further includes a mechanical system that deploys the at least one ultrasonic probe from a retracted position to a predetermined position and orientation in the borehole.

14. A downhole system for measuring properties of a multiphase fluid, comprising:
a drillstring, a wireline, or coiled tubing; and
the downhole tool of claim 1, wherein the downhole tool is coupled to the drillstring, wireline, or coiled tubing.

15. A method of measuring properties of a multiphase fluid flowing axially along a subterranean borehole at a location within the subterranean borehole, the method including:
providing the downhole tool of claim 1 within the subterranean borehole; and
measuring properties of the fluid flow with the transducer unit of the ultrasonic probe of the downhole tool by transmitting the ultrasonic acoustic waves into the multiphase fluid and using the signal processor to measure the properties of the axially flowing multiphase fluid from the reflected acoustic waves.

16. The method of claim 15, the at least one ultrasonic probe including at least first and second ultrasonic probes, and the method further comprising:
expanding a mechanical system of the downhole tool to cause one or more of a plurality of arms of the mechanical system to contact a casing wall, the plurality of arms being coupled to the first and second ultrasonic probes at different radial positions within the borehole.

17. The downhole tool of claim 1, the axial flow properties including at least one of a location of an oil-to-water interface or a thickness of a stratified oil.

* * * * *